Nov. 17, 1970 H. S. FEDER 3,541,456

FAST REFRAMING CIRCUIT FOR DIGITAL TRANSMISSION SYSTEMS

Filed Dec. 18, 1967

INVENTOR
H. S. FEDER
BY Leonard R. Arnold
ATTORNEY

United States Patent Office 3,541,456
Patented Nov. 17, 1970

3,541,456

FAST REFRAMING CIRCUIT FOR DIGITAL TRANSMISSION SYSTEMS

Herbert S. Feder, Matawan, N.J., assignor to Bell Telephone Laboratories, Incorporated, Murray Hill and Berkeley Heights, N.J., a corporation of New York Filed Dec. 18, 1967, Ser. No. 691,525
Int. Cl. H03k *5/20*
U.S. Cl. 328—56 3 Claims

ABSTRACT OF THE DISCLOSURE

A fast reframing circuit which operates upon the principle that the probability of receiving a pulse in any given bit of a received pulse train is about one-half and that if any bit, or time slot, in a received pulse signal and the signal transmitted in the same time slot of the succeeding frame are compared, the likelihood that both are pulses in much less than one-half. The circuitry utilizes an AND gate and a delay line having a delay equal to one frame of the transmitted signal. The AND gate is initially enabled to allow storage in the delay line of a number of bits equal to those transmitted in one frame. After such initial storage, the output from the delay line is fed back to the AND gate which is enabled only when pulses simultaneously appear at the output of the delay line and in the received signal. The output of the delay circuit is a pulse occurring during each framing time slot and should a transmission error occur only a time equal to about eight transmitted frames is necessary prior to the reframing circuit again generating an output signal during the framing interval. This is at least an order of magnitude faster than prior art reframing circuits.

BACKGROUND OF THE INVENTION

There are two types of framing systems. The first is the forward acting type, which transmits a unique signal which cannot be encountered elsewhere in the pulse train. This unique signal requires a unique code since in pulse code modulation systems, no information can be transmitted in pulse width or amplitude. In the receiver, control circuitry starts counting from the time of reception of this unique code to generate framing pulses which control such operations as demultiplexing and decoding. Since a unique code is transmitted, a forward acting framing circuit has the advantage of very fast action since the system inherently reframes each frame. Unfortunately, certain disadvantages are attendant the forward acting system. These disadvantages are: (1) expense; because the unique code must consist of many characters, relatively complex circuitry is required at both the transmitter and the receiver, and, (2) frequency of framing loss. As to the latter, each time a pulse error is made during transmission of the framing pattern, the system is out-of-frame and each subscribed will hear a transient noise.

The backward acting system generally requires that a much simpler code be transmitted, and instead of reframing each frame, the backward acting system gets into frame and simply checks in each frame to ascertain whether it is still in-frame. The backward acting system does not require an absolutely unique code as does the forward acting system, and once having ascertained that framing is lost, the backward acting system simply moves through the various pulse positions looking for the framing code. When it finds it, it locks to it and normal operation is resumed. While much simpler in terms of cost and complexity of equipment, the effectiveness of the backward acting system depends on the probability of its being fooled by encountering a framing code by chance in the wrong position of a pulse frame. In addition, the transmission error may be such that it will require the transmission of a large number of frames of information prior to the system finding the framing interval, since the reframing circuit generally moves through the various pulse positions at the rate of one for each received frame. For example, in the Pulse Code Modulation System, described in the January 1962 issue of the Bell System Technical Journal, 193 pulse positions comprise a frame and if the system has to go through all of those positions about 50 milliseconds will be required for reframing to take place.

It is an object of the present invention to reduce the reframing time in backward acting framing systems.

SUMMARY

In accordance with this invention, bits in each time slot of a frame are compared with the corresponding bit in the same time slot of the next recurring frame. With the exception of time slots allocated to framing pulses, the probability that both are pulses in much less than one-half. Thus, in a pulse transmission system in which framing information is transmitted by transmitting "1's" in a predetermined time slot of each frame, such comparison will, within about eight frames of the transmitted signal, quickly identify the time slots contained these framing pulses. The circuitry utilized comprises an AND gate and a delay line having a delay equal to one frame of the transmitted signal. Initially, one frame of the transmitted signal is stored in the delay line and thereafter the output of the delay line is fed back to enable the AND gate. After about eight frames of the received signal have been received, the only output signal present at the output of the delay line is a pulse which occurs during the proper framing interval and which may be used to synchronize the demultiplexing circuitry and decoders. A second embodiment of the invention discloses a modified form of apparatus for use in transmission systems where framing information is transmitted by transmitting pulses and spaces in a predetermined time slot of alternate frames.

BRIEF DESCRIPTION OF THE DRAWINGS

This invention may be more fully comprehended from the following detailed description taken in conjunction with the drawings in which.

DETAILED DESCRIPTION

Figure 1:
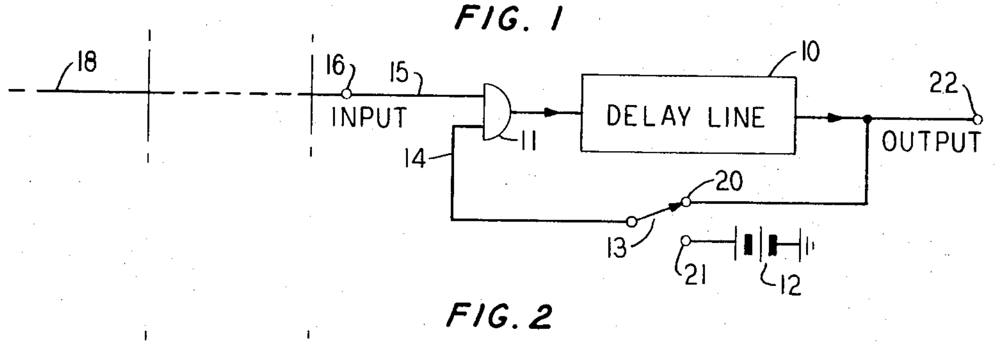
FIG. 1 is a block diagram of a reframing circuit in accordance with this invention where framing information is transmitted by a "1" in a predetermined time slot of each frame.

The fast reframing circuit shown in FIG. 1 comprises a delay line 10, an AND gate 11, a battery 12 and a single-pole, double-throw switch 13 with one terminal 20 connected to the output terminal of delay line 10 and the other terminal 21 connected to battery 12. The arm of switch 13 is connected to one input terminal 14 of AND gate 11, and the second input terminal 15 of AND gate 11 is connected to the input terminal 16 of the receiving apparatus, which, in turn, is connected to the transmission line 18. Initially, arm 13 is connected to battery 12 to enable AND gate 11 so that signals received from transmission line 18 are stored in delay line 10. The delay line 10 has a delay equal to the time duration of a frame of the transmitted signals. After at least one such frame of the transmitted signal has been received, arm 13 is connected to terminal 20 so that a feedback path from the output of delay line 10 to input terminal 14 of AND gate 11 is provided. Henceforth, the delay line 10 will have an input signal applied to it from gate 11 only when the output signal from the delay line and the input signal from transmission line 18 are both pulses. The probability of occurrence of a pulse in any time slot other than the framing interval, or time slot, is approximately one-half and the probability of occurrence of pulses in corresponding time slots of two consecutive frames is much less than one-half. Where framing information is transmitted by transmitting a "1" in a predetermined time slot of each frame, the result is that after about eight frames of the transmitted signal are received, delay line 10 is producing an ouput signal only upon the occurrence of the framing pulse. This is because the probability of receiving "1's" in corresponding time slots of successive frames is much less than one-half, and all other received pulses are soon eliminated. The framing pulses at output terminal 22 may be directly employed to operate the demultiplexing and decoding apparatus at the receiver.

When, due to transmission error, synchronization is lost, then for about eight frames the signal at output terminal 22 will be spurious; but after two or three frames have been received, the pulses present at output terminal 22 will again be the framing pulses. Despite its supreme simplicity this circuit achieves very rapid reframe times, of the order of about fifteen times faster than backward acting reframing circuits now in commercial use.

Figure 2:
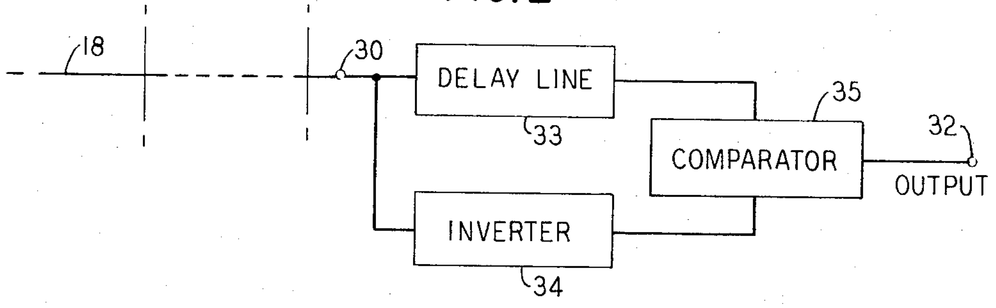
FIG. 2 is a transforming circuit for interconnection between the transmission line and the apparatus shown in FIG. 1 which enables the apparatus shown in FIG. 1 to function when framing information is transmitted by transmitting "1's" and "0's" in a predetermined time slot of alternate frames, and, FIG. 3 is a more detailed block diagram of a fast reframing circuit embodying this invention.

Frequently, it is necessary for technical reasons to transmit framing information by means other than a pulse in each framing time slot. For example, it is frequently undesirable to permit the DC level of the received signal to vary from zero. Transmission of an all "1's" framing pattern would result in the buildup of such a DC level and to avoid this, "1's" and "0's" are transmitted in alternate frames in the time slot allocated to framing information. To enable the apparatus shown in FIG. 1 to function, it is necessary to precede it with the circuit shown in FIG. 2. Terminal 30 of the circuit in FIG. 2 is connected to the transmission line 18 and its output terminal 32 is then connected to input terminal 15 of AND gate 11. The circuitry shown in FIG. 2 comprises a delay line 33 and an inverter 34, each connected between terminal 30 and the input terminals of comparator circuit 35. The delay line 33 has a delay equal to the time duration of one frame of the received signal and the comparator circuit 35 produces an output signal only when the input signals from both the delay line and the inverter are the same. Thus, in response to an alternate "01" pattern in the framing time slot, the comparator will produce a pulse output signal occurring in each framing time slot, since the inverter input signal and the delay input signal will correspond. The output signals at terminal 32 may then be examined by apparatus shown in FIG. 1 which will generate a framing pulse at the proper time during each frame.

Figure 3:
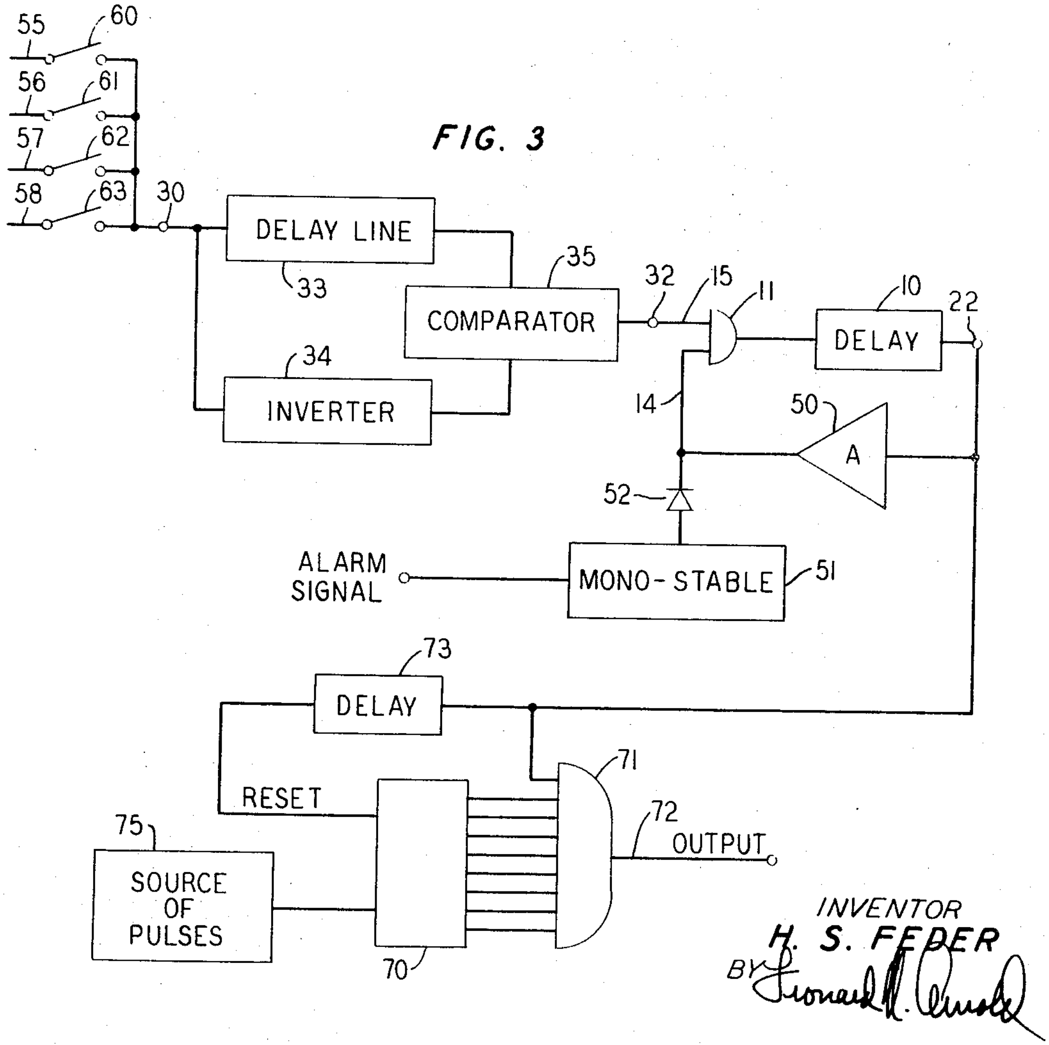

The circuitry shown in FIG. 3 is a block diagram of a fast reframing circuit used in conjunction with an alarm circuit such as that described in FIG. 10, page 17 of an article entitled "An Experimental Pulse Code Modulation System for Short-haul Trunks" published in the January, 1962 issue of the Bell System Technical Journal. The circuitry shown in the upper left hand portion of FIG. 3 corresponds to that shown in FIG. 2 and corresponding reference numerals are employed. Similarly, the circuitry shown in the upper right hand portion of FIG. 3 corresponds to the circuitry shown in FIG. 1, except for the fact that an amplifier 50 is employed to provide feedback between the output of delay circuit 10 and the input terminal 14 of AND gate 11. In addition, the battery 12 and switch 13 are replaced by a monostable circuit 51 and a diode 52.

Initially, input terminal 30 is not connected to any transmission line 55, 56, 57 and 58. When, however, the alarm circuit apparatus generates an alarm signal, an alarm signal is applied to monostable circuit 51 and also to that one of switches 60 through 63 whose closure will connect the transmission line which is out-of-synchronization to terminal 30. In accordance with this invention, the alarm signal causes monostable circuit 51 to generate a pulse whose duration is slightly longer than the time interval of a frame of the received signal. The output signal generated by monostable circuit 51 forward biases diode 52 so that AND gate 11 is enabled for a time interval at least as great as one frame. As a result, a full frame of signal information is delayed in delay line 10. After monostable circuit 51 has stopped generating its output signal, the only path then remaining between the output of delay circuit 10 and the input terminal 14 of AND gate 11 is that through amplifier 50. As a result, the above-described process takes place so that pulses are produced at the output of delay circuit 10 only upon the occurrence of a time slot allocated to framing information.

This process generally takes about eight frames of the transmitted signal and to allow sufficient time for the circuitry to eliminate those pulses from its output which result from signals in corresponding time slots of successive frames being "1's," counter 70 and an AND gate 71 are employed. The counter counts input pulses from a source of clock pulses and counts until a count equal to the number of time slots in a frame is counted. In this illustrative example, assume that a frame contains 193 time slots so that an eight-bit counter is used. The eight output terminals of eight-bit counter 70 are connected to eight of the nine input terminals of AND gate 71 with the ninth input terminal of AND gate 71 directly connected to the output of delay circuit 10. While the apparatus is engaged in the process "weeding out" pulses which do not correspond to the framing pulses, pulses will appear at terminal 22 before counter 70 has counted up to the number corresponding to the number of time slots in a frame (in this example, 193) and counter 70 will be reset by such pulses applied to its reset terminal through delay circuit 73. Until a time interval corresponding to a full frame has occurred in which no output signal is present at output terminal 22, no output signal should be generated by AND gate 71. When, however, counter 70 has counted for a time interval equal to a full frame without being reset by a signal from delay circuit 10, then AND gate 71 is enabled by the next pulse occurring at terminal 22 and an output pulse is generated at output terminal 72 to inform the alarm circuitry apparatus that reframing has occurred and that the pulses appearing at output terminal 72 are the framing pulses. In order to avoid the probability that a framing pulse at terminal 22 might reset the counter 70 prior to gate 71 generating an output framing pulse, a delay circuit 73 is connected between the reset input terminal of counter 70 and terminal 22.

Thus, whenever an alarm signal is received, the above-described apparatus is connected to the transmission line which is out-of-synchronization and serves to rapidly determine, within about eight frames of the transmitted signal, which bit or time slot contains framing information. It generates an output pulse during each framing interval which is then used to reset the alarm circuit and make the transmission lines ready for subscriber use.

Despite the obvious simplicity of the apparatus embodying this invention, the circuit is capable of extremely rapid reframing and overcomes substantially all of the objections heretofore raised as to backward acting reframing circuits.

It is to be understood that the above-described arrangements are merely illustrative of the application of the principles of the invention. Numerous other arrangements may be desired by those skilled in the art without departing from the spirit and scope of the invention.

What is claimed is:

1. Apparatus for generating a pulse upon the occurrence of a framing interval in a received pulse train comprising, in combination, a source of pulse signals comprising pulses and spaces, said signals being divided into frames of a predetermined number of time slots with one time slot of each frame being allocated to the transmission of framing information, an AND gate having two input terminals one of which is connected to receive said signals from said source, a delay line having a time delay equal to the time interval of a frame of said signals from said source connected to the output of said AND gate, a feedback circuit containing switching means connected between the output of said delay circuit and the second input of said AND gate so that said AND gate is enabled when said switching means is closed so that said feedback circuit is completed and pulses simultaneously occur at theoutput of said delay line and said received signal from said source, and means to enable said AND gate for a period of at least one frame of said transmitted signal and then close said switching means in said feedback circuit.

2. Apparatus for generating a pulse upon the occurrence of a framing interval in a received pulse train comprising, in combination, a source of pulse signals comprising pulses and spaces said signals being divided into frames of a predetermined number of time slots with one time slot of each frame containing a framing pulse, an AND gate having two input terminals one of which is connected to receive said signals from said source, a delay line having a time delay equal to the time interval of a frame of said signals from siad source connected to the output of said AND gate, a feedback circuit containing switching means connected between the output of said delay circuit and the second input of said AND gate so that said AND gate is enabled when said switching means is closed so that said feedback circuit is completed and pulses simultaneously occur at the output of said delay line and in said signal from said source, and means to enable said AND gate for a period of at least one frame of said transmitted signal and then close said switching means in said feedback circuit.

3. Apparatus for generating a pulse upon the occurrence of a framing interval in a received pulse train comprising, in combination, a source of pulse signals said signals being divided into frames of a predetermined number of time slots with one time slot of every second frame having a framing pulse transmitted therein, a first delay line having a delay equal to the time interval of a frame of said signals from said source connected to receive said signals, an inverter circuit connected to receive said signals from said source, a comparator circuit connected to receive the output signals from said inverter circuit and said delay line to generate an output signal when said output signals are the same, an AND gate having two input terminals one of which is connected to receive said signals from said comparator, a second delay line having a time delay equal to the time interval of a frame of said signals from said source connected to the output of said AND gate, a feedback circuit containing switching means connected between the output of said second delay line and the second input of said AND gate so that said AND gate is enabled when said switching means is closed so that said feedback circuit is completed and pulses simultaneously occur at the input of said delay line and in said signal from said source, and means to enable said AND gate for a period of at least one frame of said transmitted signal and then close said switching means in said feedback circuit.

References Cited

UNITED STATES PATENTS

| | | | |
|---|---|---|---|
| 2,830,179 | 4/1958 | Stenning | 328—56 XR |
| 2,912,583 | 11/1959 | Geyer | 328—164 |
| 2,942,192 | 6/1960 | Lewis | 328—164 XR |
| 3,091,737 | 5/1963 | Tellerman et al. | 328—72 |
| 3,196,358 | 7/1965 | Bagley | 307—208 XR |
| 3,386,077 | 5/1968 | Molho | 343—17.1 XR |

STANLEY T. KRAWCZEWICZ, Primary Examiner

U.S. Cl. X.R.

307—208, 232; 328—94, 110